(12) United States Patent
Huang et al.

(10) Patent No.: US 9,430,941 B2
(45) Date of Patent: Aug. 30, 2016

(54) HARVESTING TRAFFIC INFORMATION FROM MOBILE DEVICES

(75) Inventors: Ronald K. Huang, San Jose, CA (US); Jason Dere, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 13/610,807

(22) Filed: Sep. 11, 2012

(65) Prior Publication Data
US 2013/0332056 A1 Dec. 12, 2013

Related U.S. Application Data

(60) Provisional application No. 61/657,877, filed on Jun. 10, 2012.

(51) Int. Cl.
G08G 1/01 (2006.01)
G08G 1/0962 (2006.01)
H04W 4/02 (2009.01)

(52) U.S. Cl.
CPC ........... *G08G 1/0112* (2013.01); *G08G 1/0133* (2013.01); *G08G 1/0141* (2013.01); *G08G 1/0962* (2013.01); *H04W 4/028* (2013.01)

(58) Field of Classification Search
CPC G01C 21/3667; G01C 21/362; G01C 21/20; G08G 1/0112; G08G 1/0141; G08G 1/0962; H04W 74/00; H04W 52/0216; H04W 72/02; H04W 4/22; H04W 4/06; H04W 76/02; H04W 76/027; H04W 8/22; H04B 7/2123; H04N 21/41407; H04N 21/4383; H04H 20/61; H04L 29/12009; A63F 13/12

USPC ........................ 701/117, 411, 516, 414, 119; 455/127.5, 414.1, 516, 556.1, 404.1, 455/550.1, 3.01, 432.3, 412.1; 725/29, 109; 370/328, 329, 442; 375/225; 709/203
See application file for complete search history.

(56) References Cited

U.S. PATENT DOCUMENTS

| 5,862,511 | A | 1/1999 | Croyle et al. |
| 5,959,999 | A * | 9/1999 | An ........................ H04B 7/2123 370/442 |
| 6,029,111 | A | 2/2000 | Croyle |
| 6,360,167 | B1 * | 3/2002 | Millington ............. G07C 5/008 342/357.31 |
| 6,374,180 | B1 | 4/2002 | Slominski et al. |
| 6,480,783 | B1 | 11/2002 | Myr |
| 6,516,191 | B1 * | 2/2003 | Greenspan ........ H04L 29/12009 370/312 |
| 6,539,300 | B2 | 3/2003 | Myr |

(Continued)

FOREIGN PATENT DOCUMENTS

CN 101438133 5/2009

*Primary Examiner* — Yuri Kan
(74) *Attorney, Agent, or Firm* — Adeli LLP

(57) ABSTRACT

A method for collecting the information from the mobile devices for producing real-time traffic data is provided. The process ensures that the collection of data from a mobile device to be non-intrusive to the user of the mobile device by using only communication channels that are already open and by using only Global Positioning System (GPS) data from an application that is already running on the mobile device. The mobile device will participate in the data collection only if its battery power is above certain threshold level or if its battery is currently being charged. The method will not let a mobile device participate in the data collection process if the mobile device has already provided more than a threshold amount of data to the traffic data collection during a particular period of time. The method let only mobile devices that are moving beyond certain speed to participate.

27 Claims, 10 Drawing Sheets

(56) References Cited

U.S. PATENT DOCUMENTS

| | | |
|---|---|---|
| 6,577,946 B2 | 6/2003 | Myr |
| 6,615,130 B2* | 9/2003 | Myr .................. 701/117 |
| 6,710,774 B1 | 3/2004 | Kawasaki et al. |
| 6,751,467 B1* | 6/2004 | Cameron et al. ............. 455/516 |
| 6,760,369 B1* | 7/2004 | Chida ................ H04N 1/33323 |
| | | 370/468 |
| 6,862,524 B1 | 3/2005 | Nagda et al. |
| 7,054,742 B2* | 5/2006 | Khavakh ................ G01C 21/34 |
| | | 701/411 |
| 7,274,311 B1 | 9/2007 | MacLeod |
| 8,041,503 B2 | 10/2011 | Choi et al. |
| 8,121,637 B2* | 2/2012 | Zhao et al. ................ 455/550.1 |
| 8,265,862 B1* | 9/2012 | Zilka ................... G01C 21/362 |
| | | 340/988 |
| 8,509,816 B2 | 8/2013 | Branch et al. |
| 8,694,242 B2 | 4/2014 | Nagase |
| 2002/0107634 A1* | 8/2002 | Luciani ................ G08G 1/0104 |
| | | 701/117 |
| 2003/0033601 A1* | 2/2003 | Sakata ................... H04N 7/163 |
| | | 725/29 |
| 2004/0120283 A1* | 6/2004 | Rezaiifar ............ H04W 68/12 |
| | | 370/328 |
| 2004/0220721 A1* | 11/2004 | Chiang ................ G08G 1/0104 |
| | | 701/117 |
| 2005/0159138 A1* | 7/2005 | Florkey ................... H04L 12/66 |
| | | 455/414.1 |
| 2006/0173841 A1 | 8/2006 | Bill |
| 2007/0094325 A1* | 4/2007 | Ih ........................... A63F 13/12 |
| | | 709/203 |
| 2007/0135990 A1 | 6/2007 | Seymour et al. |
| 2007/0155307 A1* | 7/2007 | Ng et al. ...................... 455/3.01 |
| 2007/0213092 A1* | 9/2007 | Geelen ................ G08G 1/0969 |
| | | 455/556.1 |
| 2007/0293958 A1 | 12/2007 | Stehle et al. |
| 2009/0037093 A1 | 2/2009 | Kurihara et al. |
| 2009/0157294 A1 | 6/2009 | Geelen et al. |
| 2009/0287405 A1* | 11/2009 | Liu ........................ G01C 21/20 |
| | | 701/119 |
| 2010/0142456 A1* | 6/2010 | Lee ................... H04W 52/0216 |
| | | 370/329 |
| 2010/0185382 A1 | 7/2010 | Barker et al. |
| 2010/0325194 A1 | 12/2010 | Williamson et al. |
| 2011/0153367 A1 | 6/2011 | Amigo et al. |
| 2011/0238289 A1 | 9/2011 | Lehmann et al. |
| 2011/0282567 A1 | 11/2011 | Nortrup |
| 2012/0021709 A1* | 1/2012 | Guthrie ................... G06F 1/305 |
| | | 455/127.5 |
| 2012/0042349 A1* | 2/2012 | Ng ................... H04N 21/41407 |
| | | 725/109 |
| 2012/0059812 A1 | 3/2012 | Bliss et al. |
| 2012/0197839 A1 | 8/2012 | Vervaet et al. |
| 2013/0166096 A1 | 6/2013 | Jotanovic |
| 2013/0237215 A1* | 9/2013 | Vashi ...................... H04W 8/22 |
| | | 455/432.3 |
| 2013/0281047 A1* | 10/2013 | Daly ...................... H04W 4/22 |
| | | 455/404.1 |

* cited by examiner

HARVESTING TRAFFIC INFORMATION FROM MOBILE DEVICES

CLAIM OF BENEFIT TO PRIOR APPLICATIONS

This present Application claims the benefit of U.S. Provisional Patent Application 61/657,877, filed Jun. 10, 2012. U.S. Provisional Patent Applications 61/657,877, is incorporated herein by reference.

BACKGROUND

For a commuter who must drive through busy streets and highways in order to get home or get to work, knowing the traffic condition of the roads that lead to his destination is immensely useful. Having traffic information enables the commuter to identify the least congested route or to select the fastest route, not to mention saving time, saving fuel, and avoiding stress. However, before such traffic information can be made available to the commuter, the information must first be generated and collected.

Some providers generate such information by using traffic data collected in the past. Historical data is inexpensive to obtain since they need not be collected in real time and can be obtained from data storages. Historical data can also be reasonably useful, assuming traffic condition of today does not deviate greatly from historical averages for similar days in the past. However, historical traffic data is not real-time traffic data. It does not reflect real time traffic events such as an accident that just occurred minutes ago and is clogging up traffic right now.

It is far more useful to have traffic information that is generated based on data collected in real time. However, it is expensive to collect real time traffic data. In order to collect real time traffic data, some provider use stationary observation sensors to determine traffic flow at certain locations. Others rely on professional traffic reporter who actively report traffic conditions on the road they are traveling. This type of real time traffic information is expensive to collect. It is also difficult to provide thorough coverage of the traffic condition because it is expensive to have professional traffic reporters on all roads.

What is needed is a traffic data collection system that inexpensively provides thorough coverage of the roads. Such system can collect traffic data from devices that are already ubiquitous such as mobile phones. Such system preferably collects traffic data in a way that would not interfere with the normal usage of such devices.

SUMMARY

For mobile devices that are capable of determining their own locations and are capable of transmitting information regarding their locations to a server, some embodiments provide a process for collecting the information from the mobile devices for producing real-time traffic data. The process ensures that the collection of data from a mobile device to be non-intrusive to the user of the mobile device by using only communication channels that are already open and by using only Global Positioning System (GPS) data from an application that is already running on the mobile device. In some embodiments, the mobile device will participate in the data collection only if its battery power is above certain threshold level or if its battery is currently being charged. Some embodiments will not let a mobile device participate in the data collection process if the mobile device has already provided more than a threshold amount of data to the traffic data collection during a particular period of time. Some embodiments let only mobile devices that are moving beyond certain speed to participate.

A mobile device participating in the traffic data collection (or traffic reporting) accumulates data continuously. In some embodiments, the accumulated data include speed, position, and heading data derived from GPS coordinates. The accumulated data from the mobile devices are periodically transmitted to the server through the cell sites and base stations. The transmitted information includes speed, direction, and position of the mobile device that are accumulated over a specified time interval. In some embodiments, the mobile device accumulates and transmits these data in cyclical timing windows and use a first portion of that window of time to collect data and use a second portion of that window of time to look for an opportunity to transmit the accumulated data.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

For mobile devices that are capable of determining their own locations and are capable of transmitting information regarding their locations to a server, some embodiments provide a process for collecting the information from the mobile devices for producing real-time traffic data. The process ensures that the collection of data from a mobile device to be non-intrusive to the user of the mobile device by using only communication channels that are already open and by using only Global Positioning System (GPS) data from an application that is already running on the mobile device. In some embodiments, the mobile device will participate in the data collection only if its battery power is above certain threshold level or if its battery is currently being charged. Some embodiments will not let a mobile device participate in the data collection process if the mobile device has already provided more than a threshold amount of data to the traffic data collection during a particular period of time. Some embodiments let only mobile devices that are moving beyond certain speed to participate.

Figure 1:
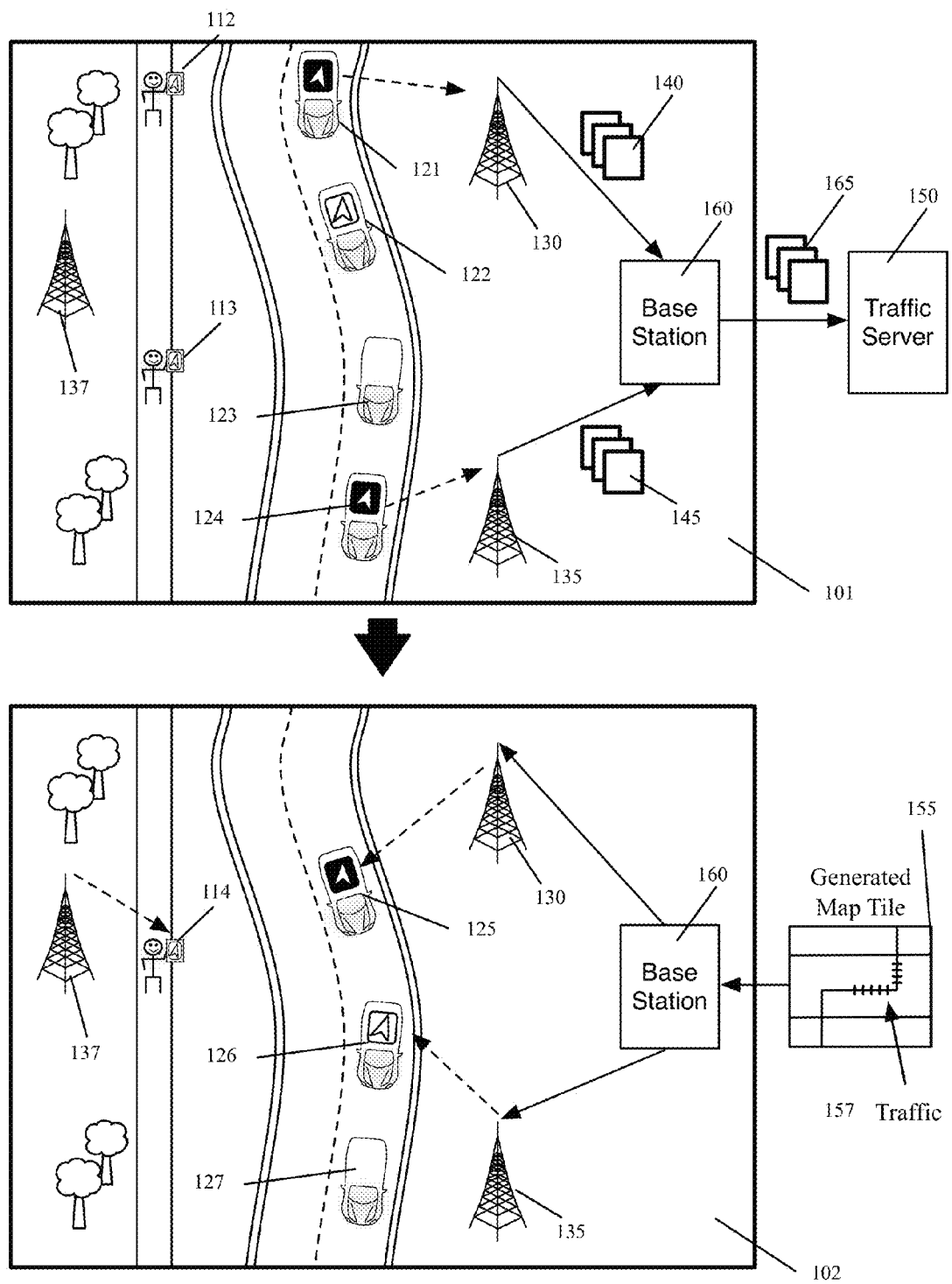
FIG. 1 illustrates the collection of data from mobile devices in a particular area for generating traffic information in a manner that is non-intrusive to the users of the mobile devices.

FIG. 1 illustrates the collection of data from mobile devices 112-113 and 121-124 in a particular area for generating traffic information in a manner that is non-intrusive to the users of the mobile devices. The figure illustrates this process in two stages 101 and 102. At the first stage 101, data 140 and 145 is collected from some of the mobile devices 121-124 through wireless service providers (represented by cell sites 130 and 135 and the base station 160). Collected data 140 and 145 from the different cell sites are aggregated into data 165 at a traffic server 150. At the second stage 102, the traffic server 150 uses the aggregated data to produce real-time traffic condition indications 157 on a generated map tile 155. The generated map tile 155 and the traffic condition indication 157 are delivered to client mobile devices 114 and 125-127 through base stations (such as base station 160) and cell sites (such as cell sites 130, 135, and 137).

Mobile devices 112-113 and 121-124 are devices capable of determining their own locations and transmitting information regarding their locations to a server. Mobile devices 112-113 and 121-124 can include any mobile computing and communication devices such as mobile phones, hand-held navigation devices, laptops, or PDAs. Mobile devices 112-113 and 121-124, in some embodiments, are devices that are identically manufactured for similar functionality, while in other embodiments they are different types of devices differently manufactured and equipped for different functions.

As illustrated, different mobile devices are being used by different users at different positions. These different users are traveling in different directions at different speeds. Mobile devices 112 and 113 are being used by pedestrians traveling at relatively slow speed. Mobile devices 121-124 are being carried in moving vehicles. However, only some of these mobile devices meet the criteria for participating in traffic data collection. Specifically, only mobile devices 121 and 124 are actively participating in the data collection, while mobile devices 112-113 and 122-123 are not participating. Mobile devices 112-113 are excluded from the traffic data collection because they do not travel at sufficient speed that is required by some embodiments. Mobile devices 122 and 123 are excluded for other reasons (e.g., lack of GPS activity, insufficient battery power, etc.). These mobile devices are not part of the road traffic that is useful for generating the real-time traffic condition information.

The traffic data collection also excludes mobile devices that do not already have their positioning functionality (such as GPS) turned on and producing GPS data or coordinates. In some embodiments, the GPS functionality of a mobile device is not turned on unless the user has directed the device to execute operations that actively produce GPS coordinates (such as navigation or taking geo-tagged photographs). FIG. 1 illustrates mobile devices with active GPS with an arrow symbol (such as the mobile devices 121, 122, and 124). Mobile devices that are not already actively performing GPS functionalities (such as mobile device 123) are excluded from the traffic data collection.

A mobile device can also be excluded from participating in the data collection process for other reasons such as not currently having an active communication channel with the server, not having sufficient battery power, not having sufficiently strong signal strength, or already having provided more than its monthly maximum of data for the traffic collection process. In some embodiments, a user may simply opt-out from participation in the data collection notwithstanding the aforementioned circumstances.

A mobile device participating in the traffic data collection (or traffic reporting) accumulates data continuously. In some embodiments, the accumulated data include speed, position, and heading data derived from GPS coordinates. The accumulated data from the mobile devices are periodically transmitted to the server 150 through the cell sites and base stations. The transmitted information includes speed, direction, and position of the mobile device that are accumulated over a specified time interval (e.g., 3 minutes). The accumulation and transmission of information based on GPS data will be further described below by reference to FIGS. 5-7.

For the mobile devices participating in the traffic data collection, information is being sent to the server 150 via wireless service providers (represented by cell sites 130 and 135 and the base station 160). The wireless service providers send the collected data 165 to the server 150. The wireless service providers can be providers of cellular phone services (via e.g., cellular sites), internet service providers (via e.g., WiFi), or any other communications service providers. In some embodiments, mobile devices participating in the traffic data collection do not necessarily belong to the same wireless service provider as long as the server 150 is able to receive the collected data 165.

The server 150 aggregates the collected data from the wireless service providers and compile a final traffic condition data 157 to the client devices 114 and 125-127. Stage 102 of FIG. 1 illustrates these mobile devices with pedestrians and vehicles at the same particular location as the mobile devices that provided the traffic data from stage 101. However, one of ordinary skill in the art would understand that client devices that receive and use the generated real-time traffic condition data can also be elsewhere, and that the client devices need not be mobile devices (e.g., desktop computers).

More detailed examples of some embodiments will be described below. Section I describes the use of existing communications channel for participating in traffic data collection. Section II then describes the accumulation and transmission of collected data. Section III describes exemplary software architecture for a mobile device that non-intrusively participates in traffic data collection for some embodiments.

I. Participation in Traffic Data Collection

As mentioned earlier, participation of a mobile device in the data collection process depends on whether the mobile device has already had an active communication channel and whether there is already an application running on the mobile device that activates GPS functionality. In some embodiments, a mobile device is allowed to participate in traffic data collection only if the mobile device already has one or more active data connections established. A data connection may be pre-existing to allow publisher or a central server to push subscribed data (e.g., sports scores, stock quotes, instant news, text message, etc.) to the mobile device as a client. A client may subscribe to various information channels. Whenever new content is available on one of those channels, the server would push that information out to the user of the mobile device. GPS data collected by the mobile device for the purpose of traffic data collection can use an active data connection to deliver data to a traffic server.

Figure 2:
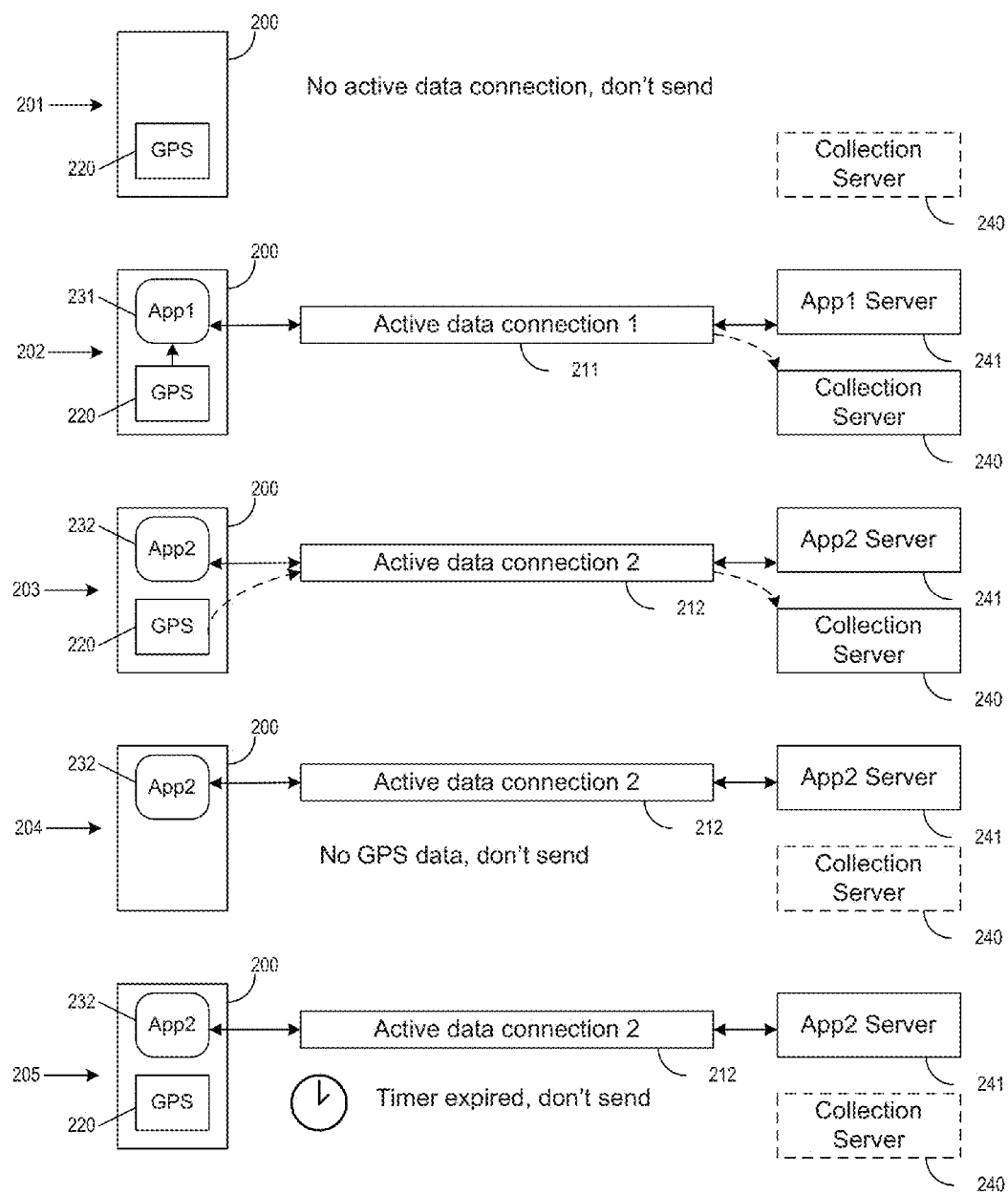
FIG. 2 illustrates five different scenarios in which a mobile device is included in or excluded from participating in the data collection process based on the status of active data connections.

For some embodiments, FIG. 2 illustrates five different scenarios 201-205 in which a mobile device 200 is included in or excluded from participating in the data collection process based on the status of active data connections 211 and 212. In some embodiments, when the mobile device participates in the traffic data collection, it sends its speed, position, and direction data to a collection server 240.

The mobile device 200 is equipped with GPS module 220. It is also capable of running applications that uses active data connections to communicate with the servers of the applications. Application 231 ("App1") uses the active data connection 211 to communicate with server 241 ("App1 server") and application 232 ("App2") uses the active data connection 212 to communicate with the server 242 ("App2 server").

In the scenario 201, the mobile device does not have an active data connection. In this scenario, even if the mobile device 200 is executing an operation that involves GPS (e.g., taking a geo-tagged photograph), no data will be collected for the traffic data collection.

The scenario 202 shows the mobile device 200 executing "App1" (application 231). "App1" is an application that uses the GPS module 220. It also uses the active data connection 211 to communicate GPS coordinates with the "App1 server" 241. Examples of such an application in some embodiments include navigation applications that receive map data or road tiles pushed in from a map server while sending the mobile device's GPS coordinates to the map server. When such applications are running on the mobile device, the data collection takes place. The speed, direction, and position data of the mobile device will be collected and send to the collection server 240.

The scenario 203 shows the mobile device 200 executing "App2" (application 232) while the GPS module 220 is active. "App2" is an application that does not use GPS module 220. However, it does use the active data connection 212 to communicate with the "App2 server" 242. Examples of such an application include stock price monitoring applications in some embodiments. Such applications do not require the use of GPS data. However, when the user of the mobile device 200 runs an application that activates the GPS capability (such as map viewer, compass, camera, and navigation, etc.), the data from the GPS module 220 will be collected and sent to the collection server via the active data connection 212.

The scenario 204 is similar to the scenario 203, except that the GPS functionality of the mobile device 200 is not active. In such a situation, the mobile device 200 will be excluded from participating in the traffic data collection even though there is an active data connection 212 for the "App2" that is currently executing on the mobile device 200.

The scenario 205 shows an example of a forced time-out that stops the mobile device 200 from participating in the data collection process. Even though the mobile device 200 still has an active data connection 212 for "App2" and still has an application running that requires an active GPS module, the mobile device 200 will not participate in the traffic data collection because of a time-out condition. For example, some embodiments include a time-out feature that forcibly terminates traffic reporting if the mobile device has been continuously providing position/speed/direction data for over a threshold amount of time (e.g., 3 hours).

Figure 3:
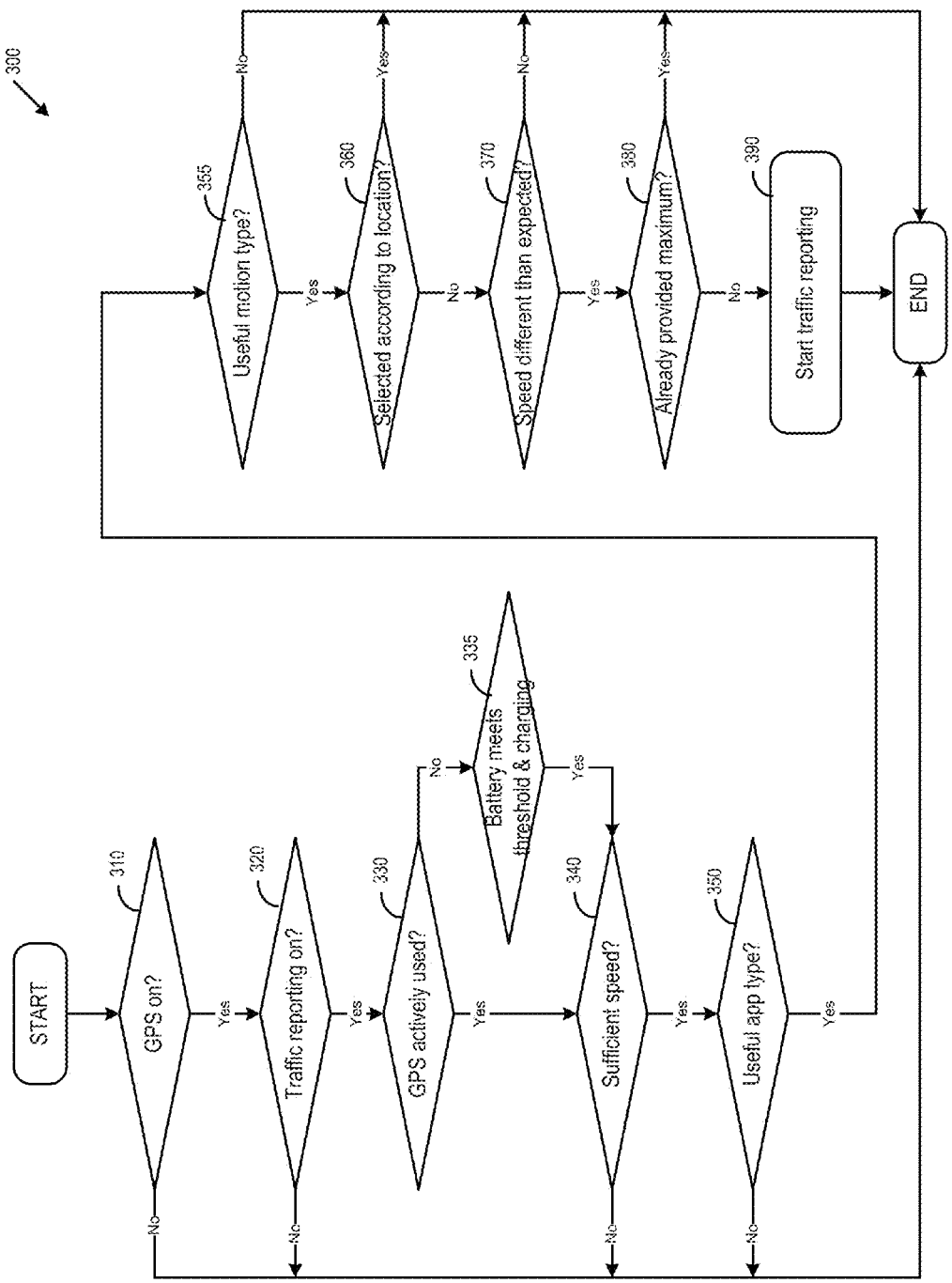
FIG. 3 conceptually illustrates a process for determining whether a mobile device should participate in the collection of data for generating real-time traffic information.

FIG. 3 conceptually illustrates a process 300 of some embodiments for determining whether a mobile device should participate in the collection of data for generating real-time traffic information. In some embodiments, this process is executed periodically (e.g., once every hour) to determine whether to participate in the traffic data collection.

The process 300 determines (at 310) whether GPS functionality of the mobile device is enabled. In some embodiments, this is a user setting of the mobile device that turns on location services for determining the position of the mobile device. If GPS functionality of the mobile device is enabled, the process proceeds to 320. Otherwise, the process 300 ends and the mobile device will not participate in the traffic data collection.

The process next determines (at 320) whether the mobile device has turned on its traffic reporting (i.e., traffic data collection) functionality. In some embodiments, this is a setting in the mobile device that allows the user of the mobile device to opt-in or opt-out of the traffic data collection. If traffic reporting functionality is turned on (i.e., the user of the mobile device has not opted-out), the process proceeds to 330. Otherwise, the process 300 ends and the mobile device will not participate in the traffic data collection.

The process next determines (at 330) whether the mobile device is already actively using GPS functionalities. A device with GPS functionalities enabled is not necessarily actively using its GPS functionalities. In some embodiments, a mobile device actively uses its GPS only when it is running applications that require GPS coordinates (e.g., navigation software, geo-tagging photographs, etc.). If the mobile device is actively using its GPS functionalities, the process proceeds to 340. Otherwise, the process proceeds to 335.

At 335, the process determines whether the mobile device's battery is above a certain threshold level (e.g., 80%) and/or is currently charging. Unless the mobile device is already actively using GPS, the process 300 will not let the traffic data collection drain battery power if the battery level is low enough to affect the user. Some embodiments therefore would allow data collection only if the mobile device is plugged into an external power source and is charging. Some embodiments would also allow data collection if the battery of the mobile device is still above a threshold level (e.g., 80%). If the mobile device is not plugged-in and the battery level is below the threshold level, the process 300 ends and the mobile device will not participate in the traffic data collection. If the battery level is sufficient and/or the mobile device is plugged-in and charging, the process proceeds to 340.

At 340, the process determines whether the mobile device is traveling at sufficient speed. Some embodiments only generate real time traffic information based on vehicles traveling on roads. For some of these embodiments, mobile devices that are not in vehicles on the road do not have useful speed/direction/position data and need not participate in the data collection process. The process therefore uses the mobile device's own speed/direction/position data generated by the GPS to determine whether the mobile device is in a moving vehicle. If the mobile device's own speed data indicates that it is moving faster than a threshold speed (e.g., 15 mph), the process proceed to 350 to continue considering whether to participate in the data collection process. If not, the process 300 ends and the mobile device will not participate in the traffic data collection.

At 350, the process determines whether to let the mobile device participate in data collection based on the type of app that is currently running on the mobile device and providing GPS coordinates. For example, GPS data collected from a vehicular navigation app (e.g., TomTom®) is likely to yield useful traffic data, while GPS collected from a running/fitness app (e.g., Nike+®) is not as likely. Some embodiments therefore use the type of the app to determine whether to participate in traffic data collection. In some embodiments, the process 300 starts data collection at a lower speed threshold for apps types that are important to traffic data collection than for apps types that are deemed less important to traffic data collection. In some embodiments, the process 300 allows traffic data collection only if the mobile device is running apps that belong to a type that is relevant to traffic data collection, regardless of speed. If the app type requires that data collection take places at the mobile device, the process proceeds to 355. If not, the process 300 ends and the mobile device will not participate in the traffic data collection.

At 355, the process determines whether to participate in data collection based on the motion type of the mobile device. In some embodiments, the mobile device is equipped with a motion sensor such that the type of motion experienced by the mobile device can be ascertained. It is possible for these types of mobile device to categorize its motion as stationary/walking/biking/automobile. In some of these embodiments, the mobile device collects traffic data only if its motion belongs to one of the desired types (e.g., only automobiles). If the motion of the mobile device belongs to one of the desired types, the process proceeds to 360. Otherwise, the process ends and the mobile device will not participate in the traffic data collection.

At 360, the process determines whether the mobile device is selected to report traffic data according to its geographical location. For example, when an abundance of traffic data is already available for a particular geographical location, only a random sample of active GPS users in that particular geographical location will participate in traffic data collection. Conversely, if additional data is needed by the traffic server to improve the quality of the real-time traffic data that it provides, more mobile devices will be selected to participate in the traffic data collection. In some embodiments, the process 300 receives information from the traffic server for determining whether the mobile device should participate in traffic data collection. In some embodiments, the process 300 makes this determination based on information that is available locally at the mobile device. If the mobile device is selected according to its location, the process proceeds to 370 to continue considering whether to participate in the data collection process. If not, the process 300 ends and the mobile device will not participate in the traffic data collection.

At 370, the process determines whether the speed of travel is different than expected. In some embodiments, the mobile device upload traffic data only if the speed the travel is different than the expected traveling speed at that time period at that particular location. For example, if a particular highway at a particular time period of a weekday is known to be always jammed, there is no need for the mobile device to report traffic data that indicates 20-30 mph speed for that particular highway at that particular time period. In some embodiments, each mobile device compares its current traveling speed with a local copy of historical data and uploads the collected traffic data only when its speed is sufficiently different from the historically expected speed. If the process determines that the difference between the actual speed of travel and the expected speed is sufficient (e.g., greater than a threshold difference), the process proceeds to 380. Otherwise, the process 300 ends and the mobile device will not participate in the traffic data collection.

At 380, the process determines whether the mobile device has already provided maximum amount of data for traffic data collection. Most mobile devices have data plans that restrict monthly data usage. In order to prevent the traffic data collection from using up too much of the mobile device's allowed data usage, the process 300 monitors how much data has already been provided by the mobile device for traffic data collection. If the mobile device has already reported more than a threshold or maximum amount of data during a particular interval of time (e.g., 2.5 Mb per month) for traffic data collection, the process 300 will not let the mobile device participate any further. Thus, if the mobile device has already provided the maximum amount of data for traffic data collection, the process 300 ends and the mobile device will not participate. Otherwise, the process 300 proceeds to 390.

At 390, the process starts to participate in traffic data collection by using a connection to send the collected position/speed/direction data. In some embodiments, the traffic data collection re-uses an existing connection, which greatly reduces data usage by avoiding the overhead of opening a new connection. However, re-using a same connection also allows the user's position to be tracked, which is not desirable for most users of the mobile devices. Some embodiments therefore force the traffic data collection to break the existing connection and to use a new connection if the GPS of the mobile device has been inactive for over a period of time (e.g., 15 minutes). After starting to participate in traffic data collection, the process 300 ends.

One of ordinary skill will recognize that the process 300 is an example of one possible process performed by some embodiments in order to determine whether a mobile device should participate in the collection of data for generating real-time traffic information. For instance, some of the operations 340, 350, 355, 360, 370, 380 need not necessarily be performed in the order shown in FIG. 3. Furthermore, some embodiments do not perform some of the operations 335, 340, 350, 355, 360, 370, 380.

Figure 4:
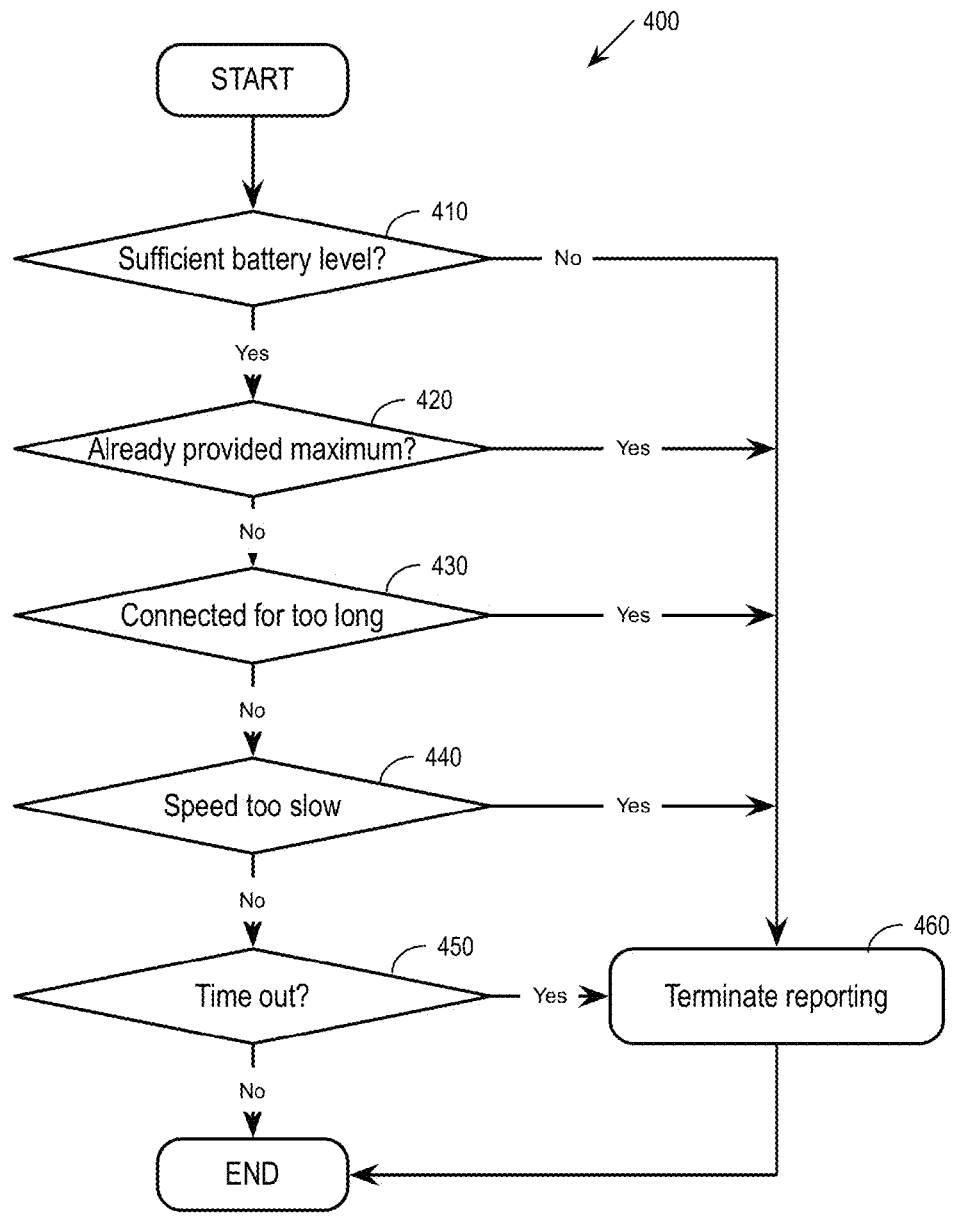
FIG. 4 conceptually illustrates a process for monitoring various conditions for deciding whether to allow the mobile device to continue to participate in traffic data collection by using the active data connection.

In some embodiments, once a mobile device starts to use an existing active data connection for data collection, a number of conditions are monitored to determine whether to terminate the data collection process. FIG. 4 conceptually illustrates a process 400 for monitoring various conditions for deciding whether to allow the mobile device to continue to participate in traffic data collection by using the active data connection. This process continues to operate as long as the mobile device is using an active data connection to participate in traffic data collection.

At 410, the process 400 determines whether the battery of the mobile device is plugged-in or is at sufficient level. If the mobile device is not plugged-in and the battery level is below the threshold level, the process 400 proceeds to 460 to stop traffic data collection. Otherwise, the process proceeds to 420.

At 420, the process 400 determines whether the mobile device has already provided the maximum amount of data for traffic data collection. If the mobile device has already provided the maximum amount of data for traffic data collection, the process 400 proceeds to 460 to terminate traffic data collection. Otherwise, the process proceeds to 430.

At 430, the process determines whether the mobile device have continuously participated in traffic data collection for too long. In some embodiments, a mobile device's participation in traffic data collection will be forcibly terminated or timed-out if the mobile device has been continuously providing its speed/position/direction for more than a threshold amount of time (e.g., 3 hours). If the mobile device has been continuously providing speed/position/direction data for more than the threshold amount of time, the process proceeds to 460 to stop using the active data connection for traffic data collection. Otherwise, the process proceeds to 440.

At 440, the process determines whether the mobile device is traveling at sufficient speed. Some embodiments only generate real time traffic information based on vehicles traveling on roads. For some of these embodiments, mobile devices that are not in vehicles on the road do not have useful speed/direction/position data and need not participate in the data collection process. If the mobile device's own speed data indicates that it is moving slower than a threshold speed (e.g., 15 mph), the process proceeds to 460 to stop using the active data connection for traffic data collection. Otherwise, the process proceeds to 450. The process of some embodiments terminates traffic reporting due to slow speed only if the mobile device has been traveling below the threshold speed for certain amount of time. This is to prevent termination of traffic data collection due to traffic congestion (e.g., auto vehicles move below 15 mph).

At 450, the process determines whether the mobile device has been using a same active data connection for traffic data collection for too long. In order to prevent the collected data from being used to track a particular mobile device (and hence its user), some embodiments include a time-out feature that forcibly terminate the use of a same active data connection for data collection if the mobile device has been continuously providing position/speed/direction data for over a threshold amount of time (e.g., 15 minutes) on that same channel. If the mobile device has been using the same active data connection for traffic data collection for too long, the process proceeds to 460 to terminate traffic reporting so to try to switch to another active data connection. Otherwise, the process 400 ends. At 460, the process ends after terminating reporting of traffic data.

II. Data Accumulation and Transmission

As mentioned, the traffic data collection server 160 in some embodiments collects speed, position, and heading/direction information from each participating mobile device. The speed/position/heading information of a mobile device is calculated based on its GPS coordinates. In some embodiments, GPS coordinates are sampled continuously (e.g., once every second) and speed/position/heading data are calculated and accumulated based on the sampled GPS coordinates. The mobile device in turn periodically transmits the accumulated speed/position/heading data to the collection server for traffic reporting. In some embodiments, the mobile device accumulates and transmits these data in cyclical timing windows (e.g., 3 minute cycles). Some embodiments use the first portion of that window of time (e.g., the first 2 minute) to collect data and use the second portion of that window of time (e.g., the final 1 minute) to look for an opportunity to transmit the accumulated data.

Figure 5:
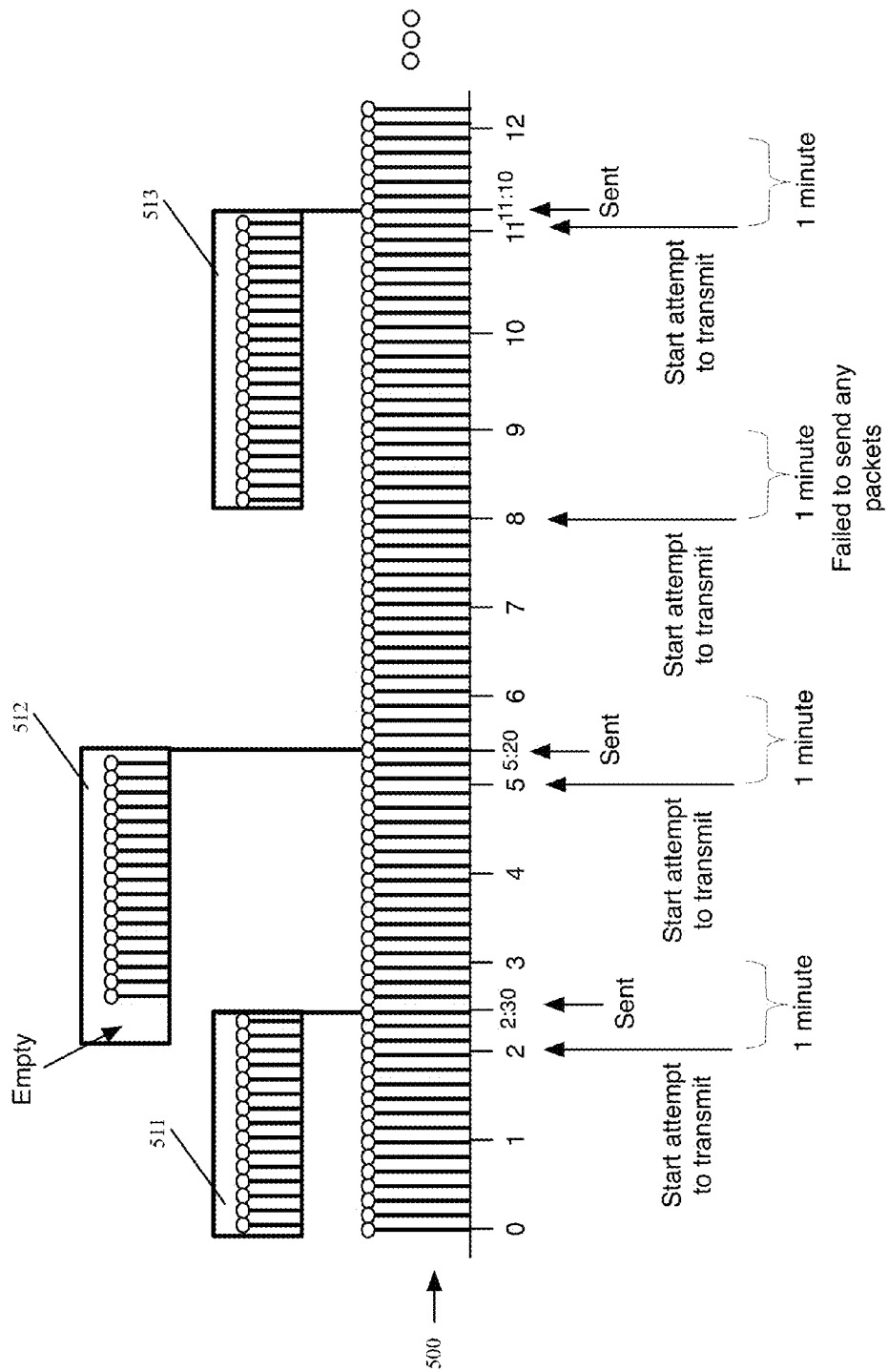
FIG. 5 illustrates the periodic accumulation and transmission of speed/position/heading data for some embodiments.

FIG. 5 illustrates the periodic accumulation and transmission of speed/position/heading data for some embodiments. The figure illustrates a series of speed/position/heading samples 500 being produced over time from the GPS of the mobile device. The mobile device includes a first-in-first-out buffer (FIFO, or a queue) that accumulates 3 minute worth of the speed/position/heading data samples. At every sampling instant (e.g., every second), the FIFO accumulates/stores one new sample and discards the oldest sample. Whenever the mobile device makes a successful transmission, all of the samples in the FIFO will be transmitted and the FIFO will be empty until the arrival of the next newest sample. FIG. 5 illustrates the three different FIFO states 511, 512, and 513. The FIFO state 511 is the state of the FIFO at time 2:30, the FIFO state 512 is the state of the FIFO at time 5:20, and the FIFO state 513 is the state of the FIFO at time 11:10. Time instances 2:30, 5:20, and 11:10 correspond to times when the content of the FIFO is transmitted to the collection server.

The figure also illustrates the timing of the data accumulation and transmission. Before time 2:00, the FIFO accumulates data samples, and no attempt is made to transmit collected data. After the time 2:00, the mobile device starts attempting to transmit the accumulated data for a one minute window that ends at 3:00. However, the transmission is successfully accomplished at 2:30, which causes the content of the FIFO to be transmitted and emptied. The FIFO starts to accumulate data again after 2:30. The mobile device starts the next attempt to transmit data at 5:00 and successfully sent the accumulated data at time 5:20. The data transmitted at 5:20 are accumulated from the time 2:30 (when FIFO was emptied) to the time 5:20 (when the transmission occurred).

FIG. 5 also illustrates a window of time within which the attempt to transmit data fails. Specifically, at time 8:00, the mobile device starts to attempt to transmit data for 1 minute. But the mobile device was not able to successfully transmit data before time 9:00 (end of the 1 minute attempt to transmit) and gives up. As a result, the data continues to accumulate for later transmission and older data continues to be emptied from the queue. At 11:00, the mobile device once again attempts to transmit data for traffic reporting. The transmission this time successfully takes place at 11:10, in which the data transmitted is accumulated from the time 8:10 (the time when the oldest sample entered the FIFO), to the time 11:10 (the time when the latest sample entered the FIFO).

Some embodiments suspend the transmission of collected speed/position/direction data if there is a voice call or if the received wireless signal strength is too weak (e.g., when RSSI value is below a certain predetermined threshold). While the transmission of the collected data is suspended, the mobile device will continue to collect GPS coordinates and wait until the suspension has lifted. If the transmission is suspended because of a voice call, the mobile device will wait until the phone call has ended to attempt transmission. If the transmission is suspended due to wireless signal weakness, the mobile device will wait for sufficient signal strength to attempt transmission again later.

Some embodiments suspend traffic reporting during voice calls because a mobile phone that uses voice and data simultaneously creates a multiple radio-access-bearer (RAB), multiple radio sphere connection, which is more taxing on the network. Some embodiments suspend traffic reporting when signal is weak because wireless communication over weak signals consumes more battery power than when signal is strong.

Figure 6:
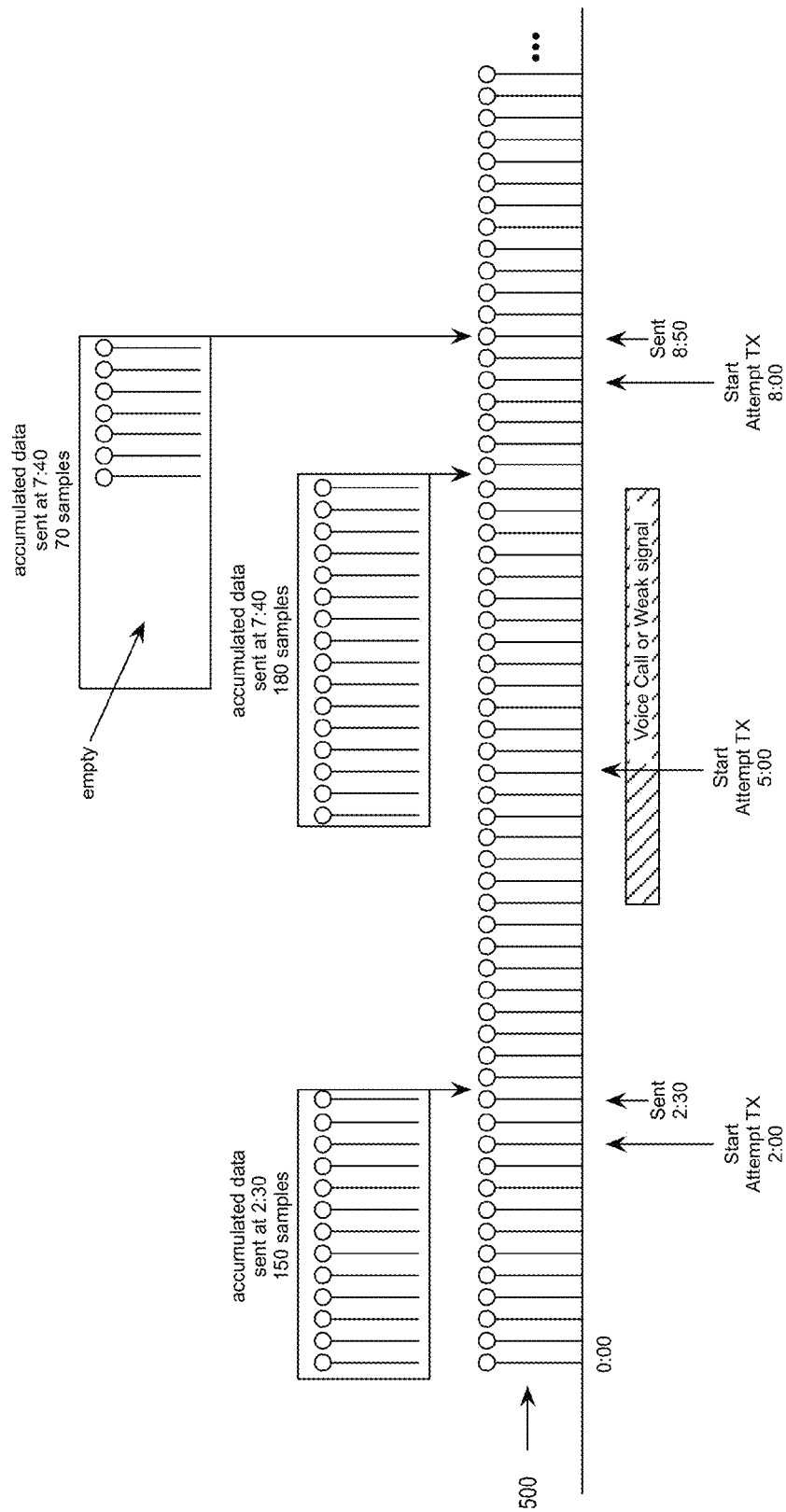
FIG. 6 illustrates a mobile device, when participating in traffic reporting, suspends reporting collected data due to voice call or weakness in signal.

FIG. 6 illustrates a mobile device, when participating in traffic reporting, suspends reporting collected data due to voice call or weakness in signal. FIG. 6 is similar to FIG. 5 in that it also illustrates the series of speed/position/heading samples 500 being produced over time from the GPS of the mobile device. FIG. 6 illustrates the mobile device periodically accumulates speed/position/heading samples cyclically over 3 minute windows and attempts to transmit collected data at times 2:00, 5:00, and 8:00. However, when the mobile device starts the attempt to transmit data at 5:00, the transmission was suspended due to a voice call or a weak signal. The suspension was lifted before 7:40, and the transmission is able to take place at 7:40 by sending the data accumulated between 4:40 and 7:40 (3 minutes or 180 samples at 1 sample data per second). The mobile device then resumes normal periodic accumulation and reporting of traffic data.

Figure 7:
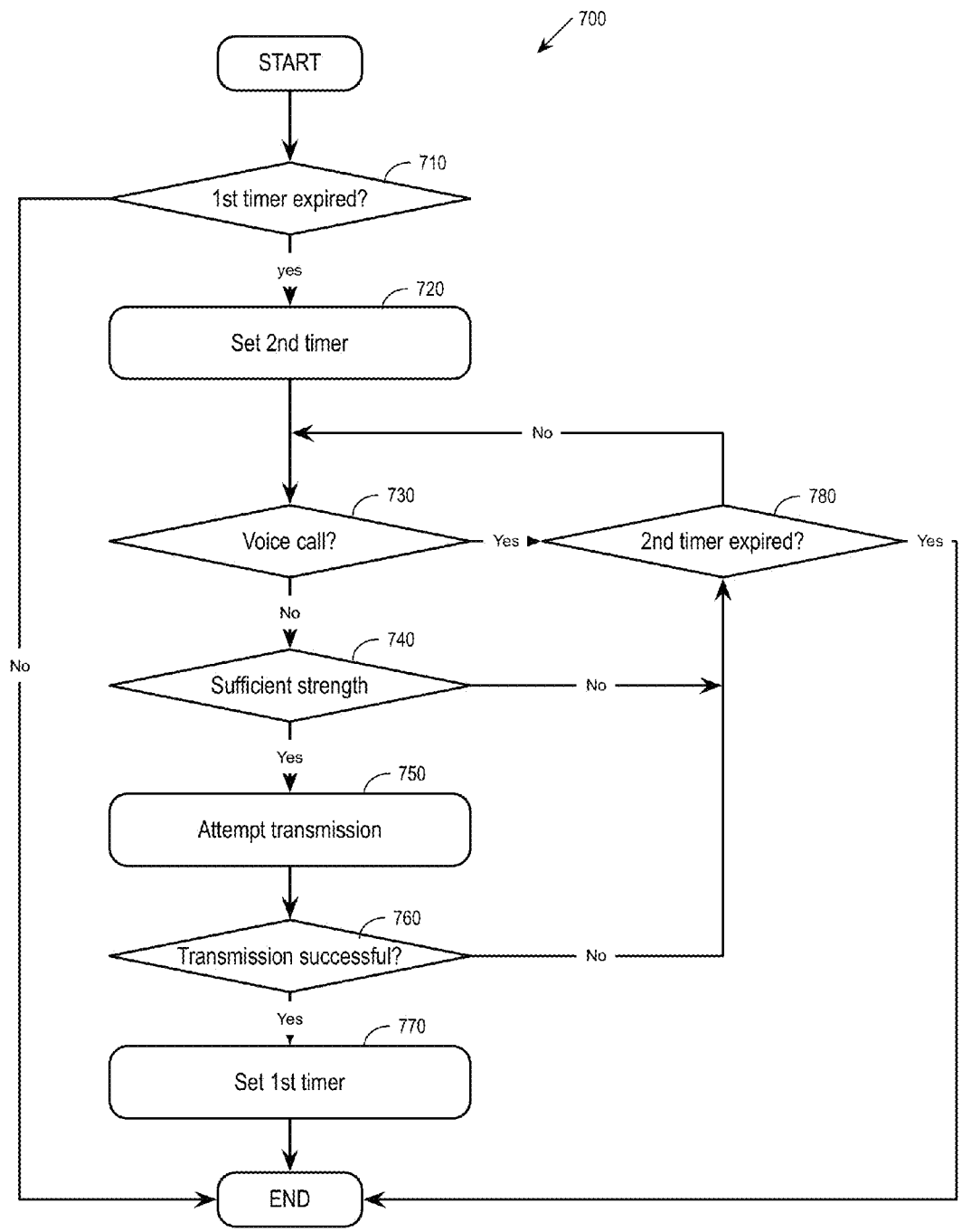
FIG. 7 conceptually illustrates a process that controls the periodic accumulation and transmission of speed/position/heading data for traffic reporting.

FIG. 7 conceptually illustrates a process 700 that controls the periodic accumulation and transmission of speed/position/heading data for traffic reporting. This process starts after the mobile device has started to participate in traffic data collection as discussed above by reference to FIG. 3. This process will not operate if the mobile device is not actively participating in the traffic data collection.

The process 700 determines (at 710) whether a first timer has expired. This first timer enforces the periodic window for traffic reporting by ensuring that data transmission occurs at most once in each window of time (i.e., every 3 minutes as in FIGS. 5 and 6) and not more than that. If the first timer has not expired, the process 700 ends. If the first timer has expired, the process proceeds to 720.

At 720, the process sets a second timer. The second timer ensures that the mobile device attempts to report collected data only during a last portion of the timing window (e.g., the 1 minute opportunity to send data). The process 700 will not make further attempt to transmit data if this second timer expires. After setting the second timer, the process proceeds to 730.

At 730, the process determines whether there is a voice call. If there is a voice call, the process proceeds to 780 to check if the second timer has expired. If there is no voice call, the process proceeds to 740.

At 740, the process determines whether the wireless signal strength is sufficient. If the signal is too weak, the process proceeds to 780 to check if the second timer has expired. If the signal is sufficiently strong, the process proceeds to 750.

The process attempts (at 750) to transmit the collected data for traffic data collection using the opened connection. As discussed earlier by reference to FIGS. 5 and 6, transmission of the collected data causes data in the FIFO that accumulates speed/position/heading samples to be transmitted and the FIFO to be emptied.

The process next determines (at 760) whether the data transmission was successful. If the transmission failed, the process proceeds to 780 to check if the second timer has expired. If the transmission was successful, the process proceeds to 770 to set the first timer. The process 700 then ends.

At 780, the process determines if the second timer has expired. If the second timer has not expired, the process returns to 730 to once again check for voice call and signal strength before attempting another transmission. If the second timer has expired, the process 700 ends and gives up trying to send data at this particular window of time. However, as long as the mobile device is still participating in traffic data collection, the process 700 will start again to check if it is time to attempt transmission.

III. Software Architecture

Figure 8:
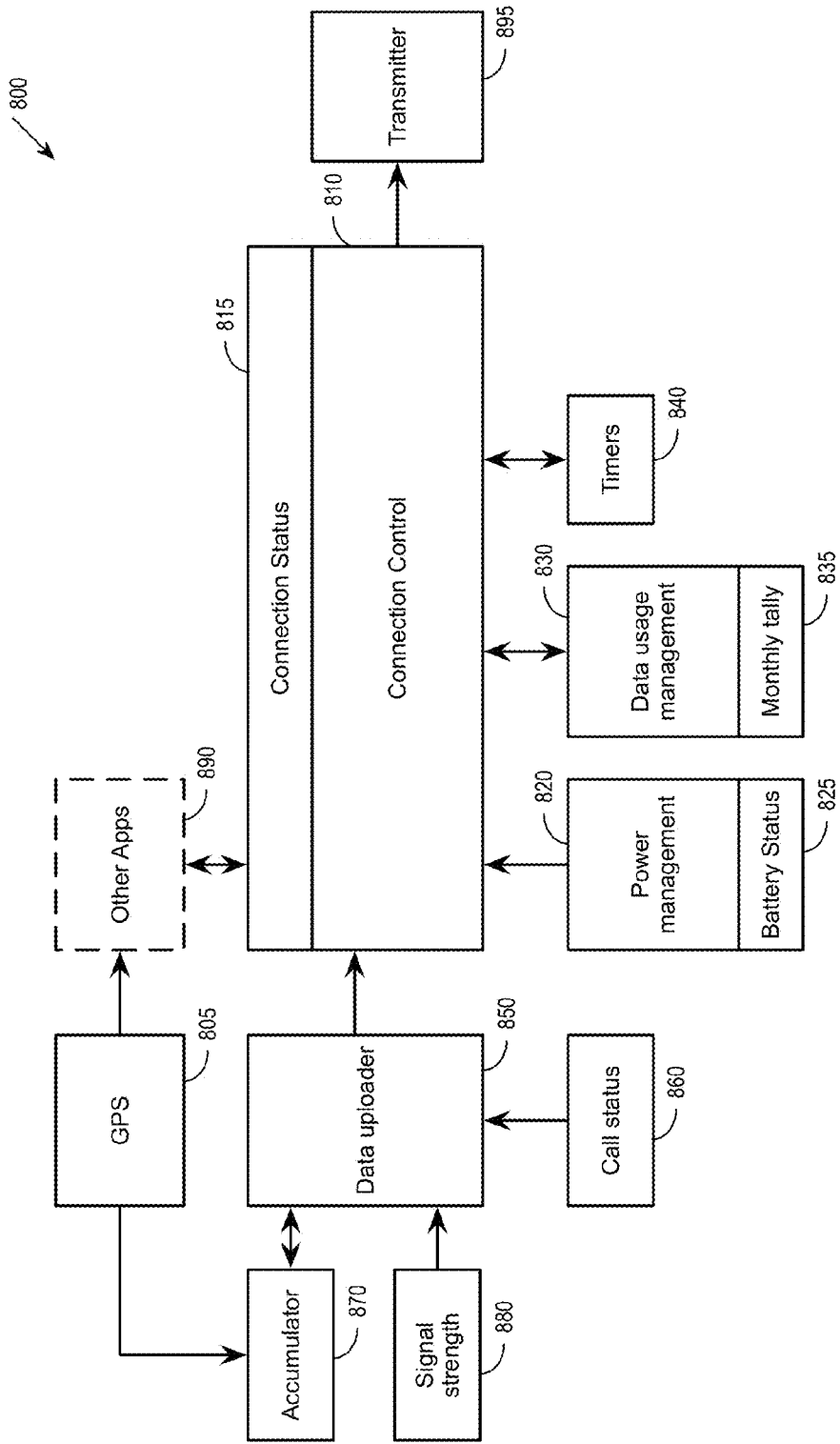
FIG. 8 illustrates a mobile device that participates in traffic reporting.

For some embodiments of the invention, FIG. 8 illustrates a mobile device 800 that participates in traffic reporting. As illustrated, the mobile device 800 includes a transmitter module 895 that is controlled by a connection control module 810. The connection control module 810 receives status from a connection status 815, a power management module 820, a data usage management module 830, and a set of timers 840. The connection control module also receives data from data upload (or collection) module 850. The upload module 850 receives data from a GPS module 805 through an accumulator 870. The upload module 850 also receives status from call status module 860 and signal strength status 880. The GPS module 850 can be in use by another app 890 running in the mobile device 800.

The connection control module 810 determines whether to participate in traffic data collection and whether to terminate participation in traffic data collection. In some embodiments, the connection control module 810 performs processes 300 and 400 as described above by reference to FIGS. 3 and 4. The connection control module 810 has access to connection status 815, which informs the connection control module 810 whether there are active data connections for transmission. These active data connections are often opened for other apps 890, which can be apps that allow servers to actively push content into the mobile device 800.

The connection control module 810 decides whether to start or terminate participation in traffic data collection based on status from power management module 820, which report battery status 825 (e.g., the battery level and whether the battery is being charged.) The connection control module 810 also receives status from data usage management module 830, which includes a monthly tally 835 which helps connection control 810 to prevent further participation in traffic reporting if the mobile device has already provided the maximum amount of data per month for traffic reporting. The connection control module 810 also receives reading from a set of timers 840. At least one of the timers 840 monitors how long has the mobile device been actively participating in traffic data collection. Another one of the timers 840 measures how long has the GPS been inactive. The connection control decides whether to terminate connection based on these readings.

The data upload module 850 provides the collected data for transmission to the collection server. It also controls the timing of data transmission and accumulation. The accumulator 870 provides the data to be transmitted. The accumulator 870 in some embodiments receives GPS coordinates from the GPS module 805 and calculates the speed/position/heading data based on the received GPS coordinates. The calculated speed/position/heading data are then accumulated in a FIFO buffer (as described above by reference to FIGS. 5 and 6). The upload module 850 also receives signal strength indication 880 and voice call status 860 for determining whether to suspend transmission of collected data to the collection server.

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
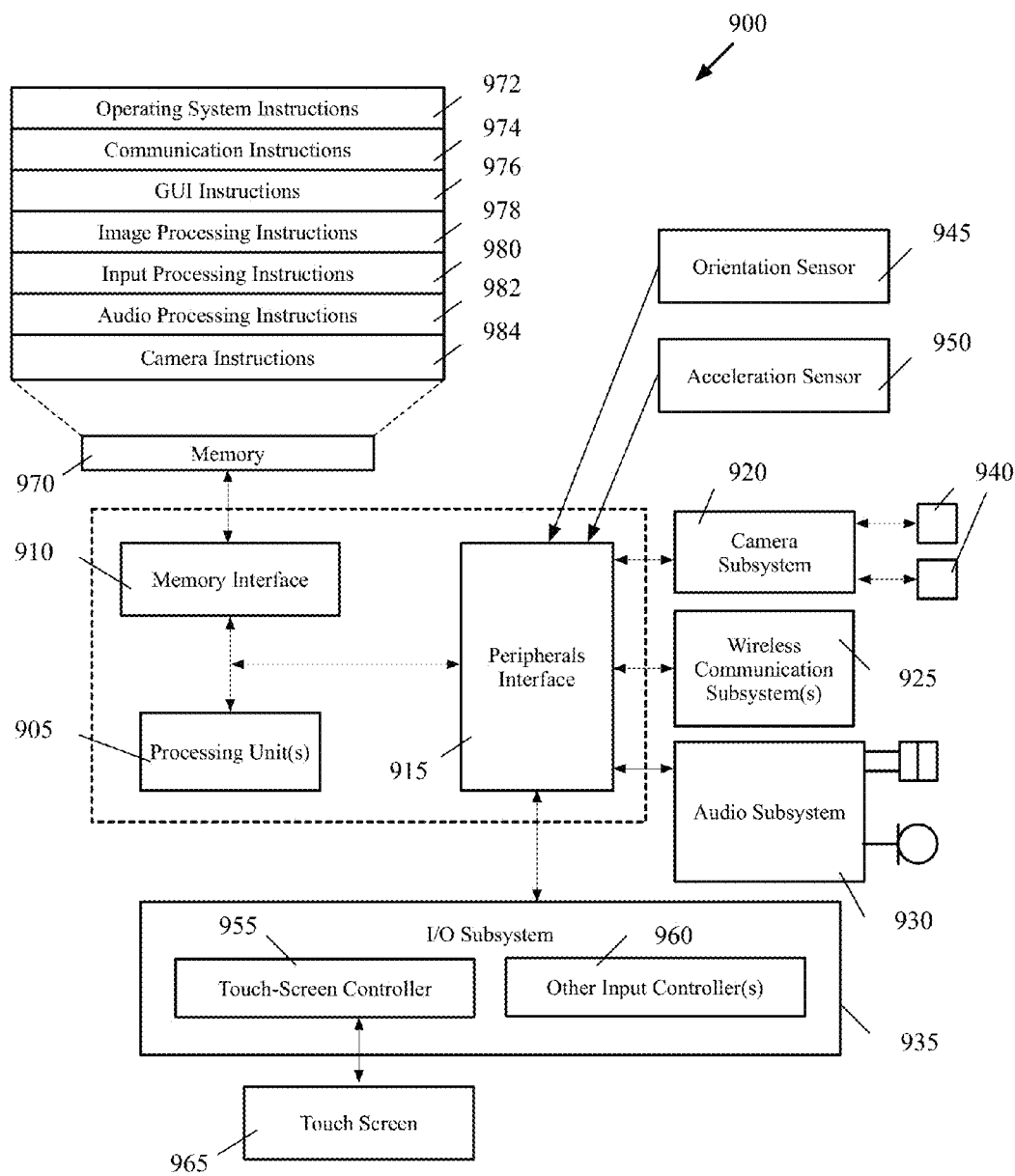
FIG. 9 is an example of an architecture of a mobile computing device.

The applications of some embodiments operate on mobile devices, such as smart phones (e.g, iPhones®) and tablets (e.g., iPads®). FIG. 9 is an example of an architecture 900 of such a mobile computing device. Examples of mobile computing devices include smartphones, tablets, laptops, etc. As shown, the mobile computing device 900 includes one or more processing units 905, a memory interface 910 and a peripherals interface 915.

The peripherals interface 915 is coupled to various sensors and subsystems, including a camera subsystem 920, a wireless communication subsystem(s) 925, an audio subsystem 930, an I/O subsystem 935, etc. The peripherals interface 915 enables communication between the processing units 905 and various peripherals. For example, an orientation sensor 945 (e.g., a gyroscope) and an acceleration sensor 950 (e.g., an accelerometer) is coupled to the peripherals interface 915 to facilitate orientation and acceleration functions.

The camera subsystem 920 is coupled to one or more optical sensors 940 (e.g., a charged coupled device (CCD) optical sensor, a complementary metal-oxide-semiconductor (CMOS) optical sensor, etc.). The camera subsystem 920 coupled with the optical sensors 940 facilitates camera functions, such as image and/or video data capturing. The wireless communication subsystem 925 serves to facilitate communication functions. In some embodiments, the wireless communication subsystem 925 includes radio frequency receivers and transmitters, and optical receivers and transmitters (not shown in FIG. 9). These receivers and transmitters of some embodiments are implemented to operate over one or more communication networks such as a GSM network, a Wi-Fi network, a Bluetooth network, etc. The audio subsystem 930 is coupled to a speaker to output audio (e.g., to output voice navigation instructions). Additionally, the audio subsystem 930 is coupled to a microphone to facilitate voice-enabled functions, such as voice recognition (e.g., for searching), digital recording, etc.

The I/O subsystem 935 involves the transfer between input/output peripheral devices, such as a display, a touch screen, etc., and the data bus of the processing units 905 through the peripherals interface 915. The I/O subsystem 935 includes a touch-screen controller 955 and other input controllers 960 to facilitate the transfer between input/output peripheral devices and the data bus of the processing units 905. As shown, the touch-screen controller 955 is coupled to a touch screen 965. The touch-screen controller 955 detects contact and movement on the touch screen 965 using any of multiple touch sensitivity technologies. The other input controllers 960 are coupled to other input/control devices, such as one or more buttons. Some embodiments include a near-touch sensitive screen and a corresponding controller that can detect near-touch interactions instead of or in addition to touch interactions.

The memory interface 910 is coupled to memory 970. In some embodiments, the memory 970 includes volatile memory (e.g., high-speed random access memory), non-volatile memory (e.g., flash memory), a combination of volatile and non-volatile memory, and/or any other type of memory. As illustrated in FIG. 9, the memory 970 stores an operating system (OS) 972. The OS 972 includes instructions for handling basic system services and for performing hardware dependent tasks.

The memory 970 also includes communication instructions 974 to facilitate communicating with one or more additional devices; graphical user interface instructions 976 to facilitate graphic user interface processing; image processing instructions 978 to facilitate image-related processing and functions; input processing instructions 980 to facilitate input-related (e.g., touch input) processes and functions; audio processing instructions 982 to facilitate audio-related processes and functions; and camera instructions 984 to facilitate camera-related processes and functions. The instructions described above are merely exemplary and the memory 970 includes additional and/or other instructions in some embodiments. For instance, the memory for a smartphone may include phone instructions to facilitate phone-related processes and functions. Additionally, the memory may include instructions for a mapping and navigation application as well as other applications. The above-identified instructions need not be implemented as separate software programs or modules. Various functions of the mobile computing device can be implemented in hardware and/or in software, including in one or more signal processing and/or application specific integrated circuits.

While the components illustrated in FIG. 9 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 9 may be split into two or more integrated circuits.

V. Map Service Environment

Figure 10:
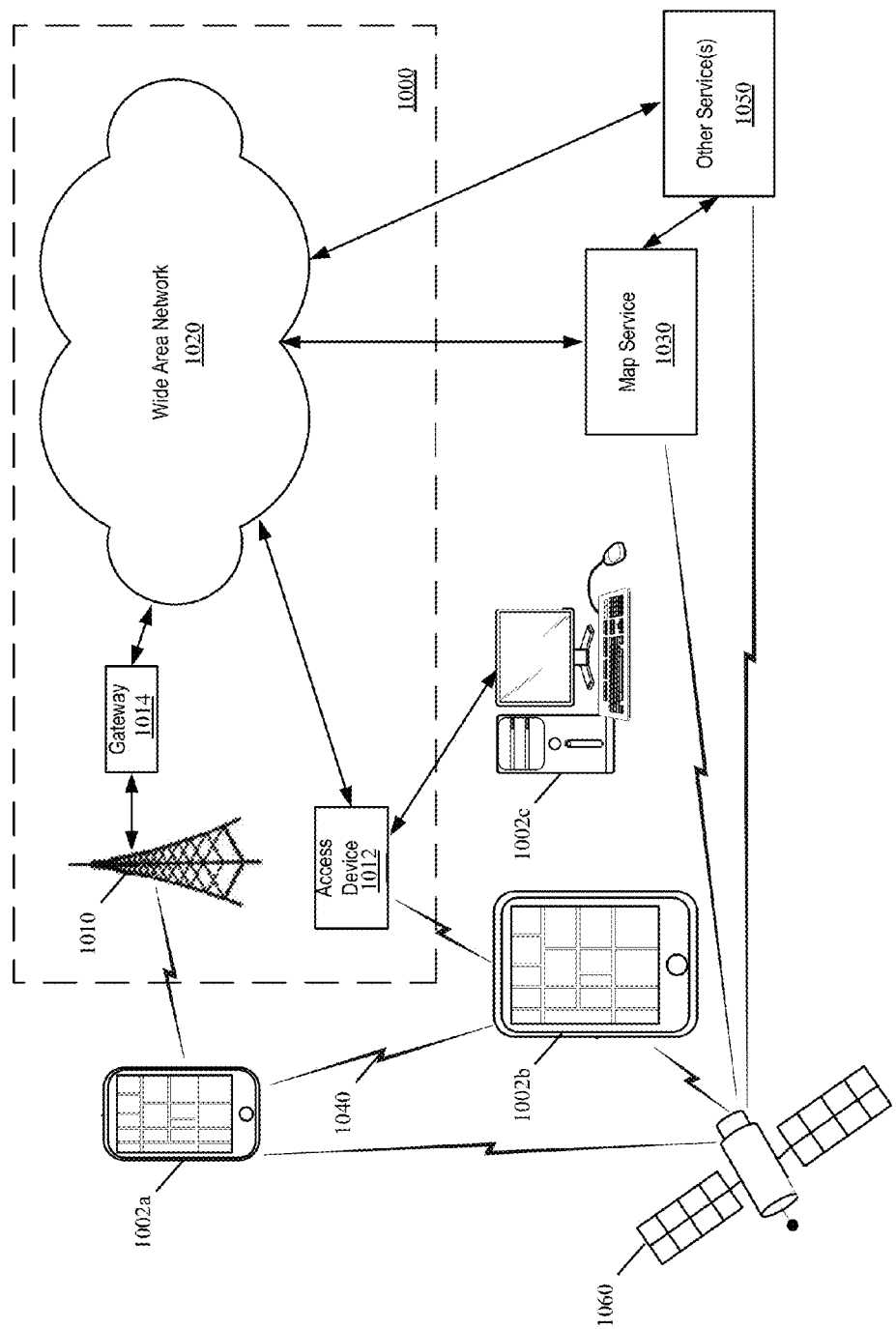
FIG. 10 illustrates a map service operating environment according to some embodiments.

Various embodiments may operate within a map service operating environment. FIG. 10 illustrates a map service operating environment, according to some embodiments. A map service 1030 (also referred to as mapping service) may provide map services for one or more client devices 1002a-1002c in communication with the map service 1030 through various communication methods and protocols. A map service 1030 in some embodiments provides map information and other map-related data, such as two-dimensional map image data (e.g., aerial view of roads utilizing satellite imagery), three-dimensional map image data (e.g., traversable map with three-dimensional features, such as buildings), route and direction calculation (e.g., ferry route calculations or directions between two points for a pedestrian), real-time navigation data (e.g., turn-by-turn visual navigation data in two or three dimensions), location data (e.g., where is the client device currently located), and other geographic data (e.g., wireless network coverage, weather, traffic information, or nearby points-of-interest). In various embodiments, the map service data may include localized labels for different countries or regions; localized labels may be utilized to present map labels (e.g., street names, city names, points of interest) in different languages on client devices. Client devices 1002a-1002c may utilize these map services by obtaining map service data. Client devices 1002a-1002c may implement various techniques to process map service data. Client devices 1002a-1002c may then provide map services to various entities, including, but not limited to, users, internal software or hardware modules, and/or other systems or devices external to the client devices 1002a-1002c.

In some embodiments, a map service is implemented by one or more nodes in a distributed computing system. Each node may be assigned one or more services or components of a map service. Some nodes may be assigned the same map service or component of a map service. A load balancing node in some embodiments distributes access or requests to other nodes within a map service. In some embodiments a map service is implemented as a single system, such as a single server. Different modules or hardware devices within a server may implement one or more of the various services provided by a map service.

A map service in some embodiments provides map services by generating map service data in various formats. In some embodiments, one format of map service data is map image data. Map image data provides image data to a client device so that the client device may process the image data (e.g., rendering and/or displaying the image data as a two-dimensional or three-dimensional map). Map image data, whether in two or three dimensions, may specify one or more map tiles. A map tile may be a portion of a larger map image. Assembling together the map tiles of a map produces the original map. Tiles may be generated from map image data, routing or navigation data, or any other map service data. In some embodiments map tiles are raster-based map tiles, with tile sizes ranging from any size both larger and smaller than a commonly-used 256 pixel by 256 pixel tile. Raster-based map tiles may be encoded in any number of standard digital image representations including, but not limited to, Bitmap (.bmp), Graphics Interchange Format (.gif), Joint Photographic Experts Group (.jpg, .jpeg, etc.), Portable Networks Graphic (.png), or Tagged Image File Format (.tiff). In some embodiments, map tiles are vector-based map tiles, encoded using vector graphics, including, but not limited to, Scalable Vector Graphics (.svg) or a Drawing File (.drw). Some embodiments also include tiles with a combination of vector and raster data. Metadata or other information pertaining to the map tile may also be included within or along with a map tile, providing further map service data to a client device. In various embodiments, a map tile is encoded for transport utilizing various standards and/or protocols, some of which are described in examples below.

In various embodiments, map tiles may be constructed from image data of different resolutions depending on zoom level. For instance, for low zoom level (e.g., world or globe view), the resolution of map or image data need not be as high relative to the resolution at a high zoom level (e.g., city or street level). For example, when in a globe view, there may be no need to render street level artifacts as such objects would be so small as to be negligible in many cases.

A map service in some embodiments performs various techniques to analyze a map tile before encoding the tile for transport. This analysis may optimize map service performance for both client devices and a map service. In some embodiments map tiles are analyzed for complexity, according to vector-based graphic techniques, and constructed utilizing complex and non-complex layers. Map tiles may also be analyzed for common image data or patterns that may be rendered as image textures and constructed by relying on image masks. In some embodiments, raster-based image data in a map tile contains certain mask values, which are associated with one or more textures. Some embodiments also analyze map tiles for specified features that may be associated with certain map styles that contain style identifiers.

Other map services generate map service data relying upon various data formats separate from a map tile in some embodiments. For instance, map services that provide location data may utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Embodiments may also receive or request data from client devices identifying device capabilities or attributes (e.g., hardware specifications or operating system version) or communication capabilities (e.g., device communication bandwidth as determined by wireless signal strength or wire or wireless network type).

A map service may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

Various embodiments of a map service may respond to client device requests for map services. These requests may be a request for a specific map or portion of a map. Some embodiments format requests for a map as requests for certain map tiles. In some embodiments, requests also supply the map service with starting locations (or current locations) and destination locations for a route calculation. A client device may also request map service rendering information, such as map textures or style sheets. In at least some embodiments, requests are also one of a series of requests implementing turn-by-turn navigation. Requests for other geographic data may include, but are not limited to, current location, wireless network coverage, weather, traffic information, or nearby points-of-interest.

A map service, in some embodiments, analyzes client device requests to optimize a device or map service operation. For instance, a map service may recognize that the location of a client device is in an area of poor communications (e.g., weak wireless signal) and send more map service data to supply a client device in the event of loss in communication or send instructions to utilize different client hardware (e.g., orientation sensors) or software (e.g., utilize wireless location services or Wi-Fi positioning instead of GPS-based services). In another example, a map service may analyze a client device request for vector-based map image data and determine that raster-based map data better optimizes the map image data according to the image's complexity. Embodiments of other map services may perform similar analysis on client device requests and as such the above examples are not intended to be limiting.

Various embodiments of client devices (e.g., client devices 1002a-1002c) are implemented on different portable-multifunction device types. Client devices 1002a-1002c utilize map service 1030 through various communication methods and protocols. In some embodiments, client devices 1002a-1002c obtain map service data from map service 1030. Client devices 1002a-1002c request or receive map service data. Client devices 1002a-1002c then process map service data (e.g., render and/or display the data) and may send the data to another software or hardware module on the device or to an external device or system.

A client device, according to some embodiments, implements techniques to render and/or display maps. These maps may be requested or received in various formats, such as map tiles described above. A client device may render a map in two-dimensional or three-dimensional views. Some embodiments of a client device display a rendered map and allow a user, system, or device providing input to manipulate a virtual camera in the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical location to manipulate a virtual camera. For instance, a client device may be tilted up from its current position to manipulate the virtual camera to rotate up. In another example, a client device may be tilted forward from its current position to move the virtual camera forward. Other input devices to the client device may be implemented including, but not limited to, auditory input (e.g., spoken words), a physical keyboard, mouse, and/or a joystick.

Some embodiments provide various visual feedback to virtual camera manipulations, such as displaying an animation of possible virtual camera manipulations when transitioning from two-dimensional map views to three-dimensional map views. Some embodiments also allow input to select a map feature or object (e.g., a building) and highlight the object, producing a blur effect that maintains the virtual camera's perception of three-dimensional space.

In some embodiments, a client device implements a navigation system (e.g., turn-by-turn navigation). A navigation system provides directions or route information, which may be displayed to a user. Some embodiments of a client device request directions or a route calculation from a map service. A client device may receive map image data and route data from a map service. In some embodiments, a client device implements a turn-by-turn navigation system, which provides real-time route and direction information based upon location information and route information received from a map service and/or other location system, such as Global Positioning Satellite (GPS). A client device may display map image data that reflects the current location of the client device and update the map image data in real-time. A navigation system may provide auditory or visual directions to follow a certain route.

A virtual camera is implemented to manipulate navigation map data according to some embodiments. Some embodiments of client devices allow the device to adjust the virtual camera display orientation to bias toward the route destination. Some embodiments also allow virtual camera to navigation turns simulating the inertial motion of the virtual camera.

Client devices implement various techniques to utilize map service data from map service. Some embodiments implement some techniques to optimize rendering of two-dimensional and three-dimensional map image data. In some embodiments, a client device locally stores rendering information. For instance, a client stores a style sheet which provides rendering directions for image data containing style identifiers. In another example, common image textures may be stored to decrease the amount of map image data transferred from a map service. Client devices in different embodiments implement various modeling techniques to render two-dimensional and three-dimensional map image data, examples of which include, but are not limited to: generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data. Some embodiments of client devices also order or prioritize map service data in certain techniques. For instance, a client device detects the motion or velocity of a virtual camera, which if exceeding certain threshold values, lower-detail image data is loaded and rendered of certain areas. Other examples include: rendering vector-based curves as a series of points, preloading map image data for areas of poor communication with a map service, adapting textures based on display zoom level, or rendering map image data according to complexity.

In some embodiments, client devices communicate utilizing various data formats separate from a map tile. For instance, some client devices implement Assisted Global Positioning Satellites (A-GPS) and communicate with location services that utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Client devices may also receive GPS signals directly. Embodiments may also send data, with or without solicitation from a map service, identifying the client device's capabilities or attributes (e.g., hardware specifications or operating system version) or communication capabilities (e.g., device communication bandwidth as determined by wireless signal strength or wire or wireless network type).

FIG. 10 illustrates one possible embodiment of an operating environment 1000 for a map service 1030 and client devices 1002a-1002c. In some embodiments, devices 1002a, 1002b, and 1002c communicate over one or more wire or wireless networks 1010. For example, wireless network 1010, such as a cellular network, can communicate with a wide area network (WAN) 1020, such as the Internet, by use of gateway 1014. A gateway 1014 in some embodiments provides a packet oriented mobile data service, such as General Packet Radio Service (GPRS), or other mobile data service allowing wireless networks to transmit data to other networks, such as wide area network 1020. Likewise, access device 1012 (e.g., IEEE 802.11g wireless access device) provides communication access to WAN 1020. Devices 1002a and 1002b can be any portable electronic or computing device capable of communicating with a map service. Device 1002c can be any non-portable electronic or computing device capable of communicating with a map service.

In some embodiments, both voice and data communications are established over wireless network 1010 and access device 1012. For instance, device 1002a can place and receive phone calls (e.g., using voice over Internet Protocol (VoIP) protocols), send and receive e-mail messages (e.g., using Simple Mail Transfer Protocol (SMTP) or Post Office Protocol 3 (POP3)), and retrieve electronic documents and/or streams, such as web pages, photographs, and videos, over wireless network 1010, gateway 1014, and WAN 1020 (e.g., using Transmission Control Protocol/Internet Protocol (TCP/IP) or User Datagram Protocol (UDP)). Likewise, in some implementations, devices 1002b and 1002c can place and receive phone calls, send and receive e-mail messages, and retrieve electronic documents over access device 1012 and WAN 1020. In various embodiments, any of the illustrated client device may communicate with map service 1030 and/or other service(s) 1050 using a persistent connection established in accordance with one or more security protocols, such as the Secure Sockets Layer (SSL) protocol or the Transport Layer Security (TLS) protocol.

Devices 1002a and 1002b can also establish communications by other means. For example, wireless device 1002a can communicate with other wireless devices (e.g., other devices 1002b, cell phones, etc.) over the wireless network 1010. Likewise devices 1002a and 1002b can establish peer-to-peer communications 1040 (e.g., a personal area network) by use of one or more communication subsystems, such as Bluetooth® communication from Bluetooth Special Interest Group, Inc. of Kirkland, Wash. Device 1002c can also establish peer to peer communications with devices 1002a or 1002b (not shown). Other communication protocols and topologies can also be implemented. Devices 1002a and 1002b may also receive Global Positioning Satellite (GPS) signals from GPS satellites 1060.

Devices 1002a, 1002b, and 1002c can communicate with map service 1030 over the one or more wire and/or wireless networks, 1010 or 1012. For instance, map service 1030 can provide a map service data to rendering devices 1002a, 1002b, and 1002c. Map service 1030 may also communicate with other services 1050 to obtain data to implement map services. Map service 1030 and other services 1050 may also receive GPS signals from GPS satellites 1060.

In various embodiments, map service 1030 and/or other service(s) 1050 are configured to process search requests from any of client devices. Search requests may include but are not limited to queries for business, address, residential locations, points of interest, or some combination thereof. Map service 1030 and/or other service(s) 1050 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria include but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 1030 and/or other service(s) 1050 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 1030 and/or other service(s) 1050, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 1030 and/or other service(s) 1050 provide one or more feedback mechanisms to receive feedback from client devices 1002a-1002c. For instance, client devices may provide feedback on search results to map service 1030 and/or other service(s) 1050 (e.g., feedback specifying ratings, reviews, temporary or permanent business closures, errors etc.); this feedback may be used to update information about points of interest in order to provide more accurate or more up-to-date search results in the future. In some embodiments, map service 1030 and/or other service(s) 1050 may provide testing information to the client device (e.g., an A/B test) to determine which search results are best. For instance, at random intervals, the client device may receive and present two search results to a user and allow the user to indicate the best result. The client device may report the test results to map service 1030 and/or other service(s) 1050 to improve future search results based on the chosen testing technique, such as an A/B test technique in which a baseline control sample is compared to a variety of single-variable test samples in order to improve results.

The invention claimed is:

1. A non-transitory machine readable storage medium storing a program for non-intrusively collecting real-time traffic information from a mobile device, the computer program comprising sets of instructions for:

gathering position data produced by the mobile device;

deriving traffic data from the gathered position data;

identifying an active data communication channel of the mobile device that is currently being used for transmitting application data for a particular application from the mobile device to a first set of servers;

using the identified active data communication channel to transmit the derived traffic data to a second set of servers and to transmit the application data to the first set of servers;

monitoring the mobile device for a set of terminating conditions; and upon detection of at least one of the terminating conditions, terminating the transmission of the derived traffic data to the second set of servers over the identified active data communication channel while maintaining the transmission of the application data to the first set of servers.

2. The non-transitory machine readable storage medium of claim 1, wherein the set of instructions for terminating the transmission of the traffic data comprises a set of instructions for terminating the transmission of the traffic data when the mobile device does not have sufficient battery level.

3. The non-transitory machine readable storage medium of claim 1, wherein the set of instructions for terminating the transmission of the traffic data comprises a set of instructions for terminating the transmission of the traffic data when the mobile device is not plugged into a power source.

4. The non-transitory machine readable storage medium of claim 1, wherein the set of instructions for terminating the transmission of the traffic data comprises a set of instructions for terminating the transmission of the traffic data when the mobile device has already provided more than a maximum amount of data to the second set of servers over a particular interval of time.

5. The non-transitory machine readable storage medium of claim 1, wherein the set of instructions for terminating the transmission of the traffic data comprises a set of instructions for terminating the transmission of the traffic data when the mobile device has continuously transmitted traffic data for over a particular period of time.

6. The non-transitory machine readable storage medium of claim 1, wherein the set of instructions for terminating the transmission of the traffic data comprises a set of instructions for terminating the transmission of the traffic data when the mobile device is traveling below a minimum speed.

7. The non-transitory machine readable storage medium of claim 1, wherein the traffic data comprises at least one of speed, position, and direction information of the mobile device.

8. The non-transitory machine readable storage medium of claim 1, wherein the set of instructions for transmitting the traffic data further comprises a set of instructions for accumulating data over a particular window of time.

9. The non-transitory machine readable storage medium of claim 8, wherein the set of instructions for transmitting the traffic data further comprises a set of instructions for periodic transmission of the accumulated data.

10. The non-transitory machine readable storage medium of claim 9, wherein the set of instructions for transmitting the traffic data further comprises a set of instructions for suspending the periodic transmission when the mobile device is conducting a voice call.

11. The non-transitory machine readable storage medium of claim 9, wherein the set of instructions for transmitting the traffic data further comprises a set of instructions for suspending the periodic transmission when strength of signal received by the mobile device is weaker than a threshold.

12. A mobile device comprising:
a set of processing units; and
a machine readable medium storing a program for execution by at least one of the processing units, the program comprising:
   a global positioning (GPS) module for detecting positions of the mobile device;
   a data accumulation module for accumulating traffic data based on the detected positions of the mobile device; and
   a connection control module for (i) identifying an active data communication channel of the mobile device that is currently being used for transmitting application data for a particular application from the mobile device to a first set of servers, and (ii) using the identified active data communication channel to transmit the accumulated traffic data to a second set of servers and to transmit the application data to the first set of servers, (iii) monitoring the mobile device for a set of terminating conditions, and (iv) terminating, upon detection of at least one of the terminating conditions, the transmission of the derived traffic data to the second set of servers over the identified active data communication channel while maintaining the transmission of the application data to the first set of servers.

13. The mobile device of claim 12, wherein the connection control module transmits the accumulated traffic data when the mobile device is running an application that uses the GPS module.

14. The mobile device of claim 12, wherein the active data communication channel is an active push channel for pushing data into the mobile device.

15. The mobile device of claim 12, wherein the data accumulation module accumulates the traffic data over a particular window of time.

16. The mobile device of claim 12, wherein the connection control module refrains from transmitting the accumulated traffic data unless the mobile device is moving above a minimum speed.

17. The mobile device of claim 12, wherein the mobile device further comprises a motion sensor, wherein the connection control determines whether to transmit the accumulated traffic data based on a motion type detected by the motion sensor.

18. A method for providing real-time traffic data, the method comprising:
   at a first set of servers, receiving speed and position data transmitted by a plurality of mobile devices,
   wherein at least one of the mobile devices identifies an active data communication channel that is currently being used for transmitting application data for a particular application from the mobile device to a second set of servers and uses the identified active data communication channel to transmit the mobile device's speed and position data to the first set of servers and to transmit the application data to the second set of servers, wherein each mobile device monitors a set of terminating conditions and terminates the transmission of the derived traffic data to the first set of servers over the identified active data communication channel upon detection of at least one of the terminating conditions while maintaining the transmission of the application data to the second set of servers;
   generating real-time traffic data derived from the speed and position data received from the plurality of mobile devices; and providing the generated real-time traffic data to subscribing devices.

19. The method of claim 18, wherein the active data communication channel is being used by an application running on the mobile device.

20. The method of claim 19, wherein the speed and position data of the mobile device is based on GPS data generated for the application running on the mobile device.

21. The method of claim 18, wherein each mobile device of the plurality of mobile devices is plugged in or has sufficient battery level.

22. The method of claim 18, wherein each mobile device of the plurality of mobile devices is moving faster than a minimum speed.

23. A method for collecting real-time traffic data from a mobile device, the method comprising:

identifying an active data connection that is currently used by the mobile device for transmitting application data of a particular application from the mobile device to a first set of servers;

gathering position data produced by the mobile device;

deriving traffic data from the gathered position data;

using the identified active data connection to transmit the derived traffic data to a second set of servers and to transmit the application data to a first set of servers;

monitoring the mobile device for a set of termination conditions; and upon detection of at least one of the terminating conditions, terminating the transmission of the derived traffic data to the second set of servers over the identified active data communication channel while maintaining the transmission of the application data to the first set of servers.

24. The method of claim 23 further comprising determining whether to participate in real-time traffic data collection.

25. The method of claim 24, wherein determining whether to participate in real-time traffic data collection is based on a type of the identified application.

26. The method of claim 24, wherein determining whether to participate in real-time traffic data collection is based on a geographical location of the mobile device.

27. The method of claim 24, wherein determining whether to participate in real-time traffic data collection is based on whether the mobile device is plugged in or is at sufficient battery level.

* * * * *